July 18, 1944.  J. E. OSLUND  2,354,046
INDICATOR HOLDER
Filed March 6, 1943
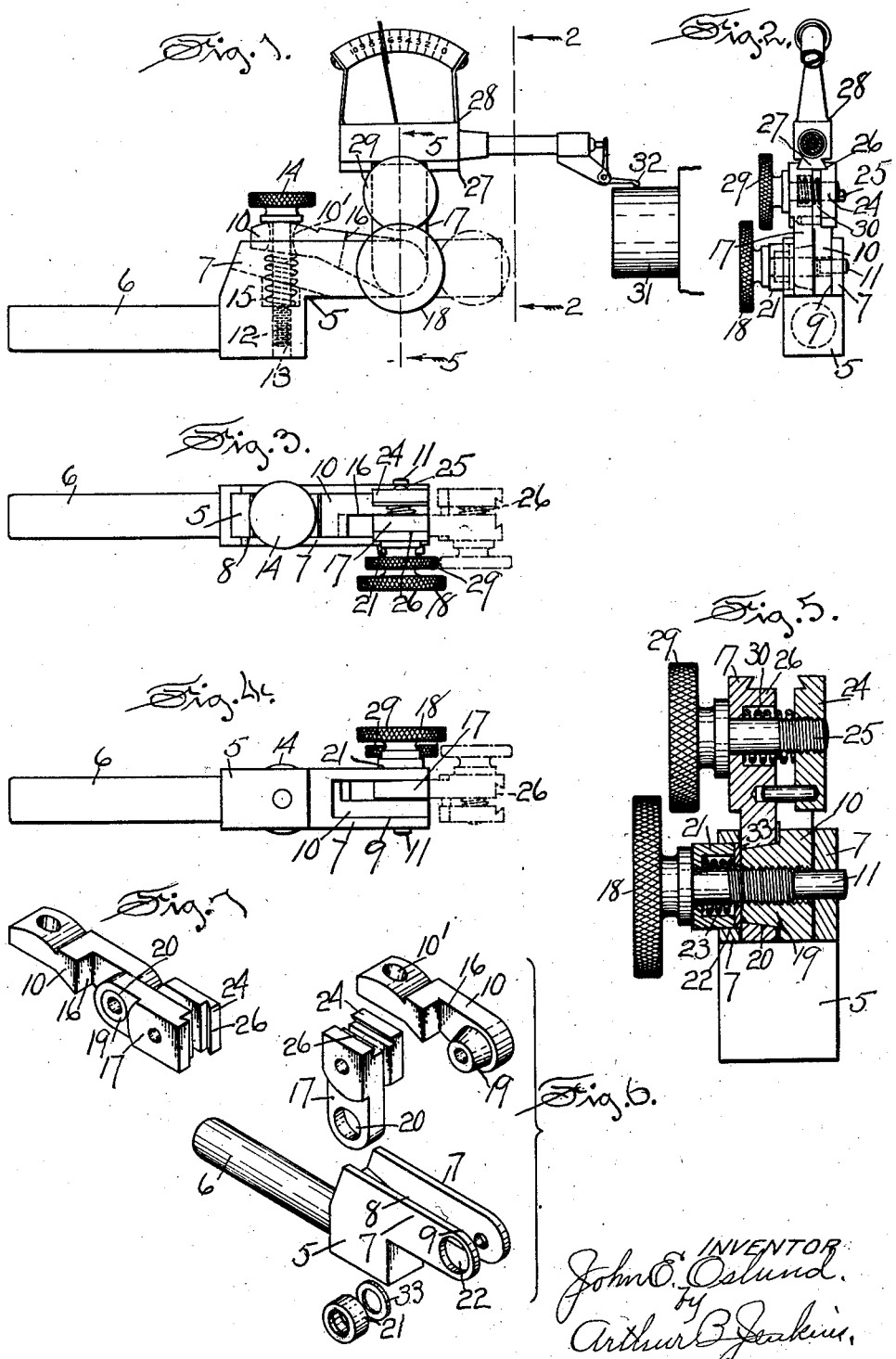

Patented July 18, 1944

2,354,046

UNITED STATES PATENT OFFICE 2,354,046

INDICATOR HOLDER

John E. Oslund, Wethersfield, Conn.

Application March 6, 1943, Serial No. 478,317

10 Claims. (Cl. 248—288)

My invention relates to the class of holders for the support of indicators used in gaging with machine tools, said indicators being of the nature of micrometer gages for denoting diameters and other measurements of work being operated upon by tools in the machine to which the holder is attached, and an object of my invention, among others, is the production of a holder for this purpose that shall be simple in construction and particularly efficient for the purpose for which it is designed.

One form of an indicator holder embodying my invention and in the construction and use of which the objects herein set out, as well as others, may be attained is illustrated in the accompanying drawing, in which—

Figure 1 is a view in side elevation of my improved holder showing its manner of application and use, an extended position of the support for the gage being illustrated in broken lines.

Figure 2 is a view in section on a plane denoted by the broken line 2—2 of Fig. 1.

Figure 3 is a top plan view of the holder as shown in Fig. 1.

Figure 4 is a bottom view.

Figure 5 is a view on enlarged scale and in section on a plane denoted by the broken line 5—5 of Fig. 1.

Figure 6 is an isometric view of parts of the holder separated but in relative positions for assembly.

Figure 7 is an isometric view of the adjusting lever and indicator support attached one to the other.

In the accompanying drawing in Fig. 1 the holder is shown supporting an indicator in active position with respect to a piece of work, the holder comprising a body 5 having a supporting shank 6 for entry into a chuck or similar support comprising a part of the frame of the machine upon which work is being performed, which machine may be a jig borer, a boring mill, or other machine tool and in a manner that will be readily understood by those skilled in the art in the use of such tools. The body 5 is of angular shape as a whole and comprises sides 7 spaced apart to form a groove 8 that extends along the body from that end from which extends the shank 6 and opens into a notch 9 at the end of the body opposite the shank 6.

An adjusting lever 10 comprises one part of a joint constituting a pivotal mount for said lever extending across and filling the gap comprising the notch 9 at the end of the body and a clamp screw 11 also forming a member of said joint is employed to bind the members of the joint, as shown in Fig. 3. An adjusting screw 12 extends into a threaded opening 13 in the body, this screw having a thumb piece 14 as a means for turning it within a hole 10' in said lever.

A spring 15 seated in a recess in the bottom of the groove 8 is supported on the screw 12 and thrusts against the end of the lever 10 to bias said lever in one direction. The opposite end of the lever has a recess 16 on one side within which an indicator support 17 is located, this support being pivotally mounted on the pivot screw 11, the latter having a finger piece 18 as a means for operating it. The adjusting lever 10 has a clamping hub 19 extending outwardly from the bottom of the recess 16, this hub being smaller at its outer end. The hub extends into and through a hole 20 of a similar shape in the support 17, the screw 11 extending through said hub and being threaded therein. A thimble 21 is located in an enlarged hole 22 in one of the sides 7, as shown in Fig. 5 of the drawing, the clamp screw 11 extending through this thimble. A spring 23 seated within the thimble 21 and against the bottom thereof thrusts said thimble against the inner end of the finger piece 18, said spring being seated against a plate 33 closing the end of the thimble and seated against the end of the hub 19, as shown in Fig. 5 of the drawing.

A clamp 24 is screw threadedly mounted on a clamp screw 25 extending through the indicator support 17, said clamp and said support having a dove-tailed groove 26 formed between them to receive a dove-tailed projection 27 on the under side of an indicator 28 as shown in Figs. 1 and 5. The clamp screw 25 has a finger piece 29 as a means for operating it and a spring 30 seated in a recess at the side of the support 17 biases the clamp 24 away from said support in position to receive an indicator for operation as upon a work piece 31 located in the machine, as a jig borer, milling or similar machine. The shank 6 of the holder is secured in a chuck or similar retainer with which the machine frame is supplied. The indicator support is positioned as shown in Fig. 1 and clamped therein by means of the pivot clamp screw 11 operated by the finger piece 18. As said screw is screwed into the hub 19 the latter is forced into the hole 20 and the flange on the finger piece 18 forces the thimble 21 tightly against the plate 33 thereby causing pressure by the thimble against the side of the indicator support 17, thus securing the lever 10, indicator support 17, and thimble 21 tightly together so that these several parts rotate as one piece when operated by the adjusting screw 12 to position the indicator 28 with a contact finger 32 in proper contact with the work piece 31. In this adjusting movement the bearing for pivotal movement of the parts just described is that of the thimble 21 in one of the sides 7 on the body and of the pivot clamp screw 11 in the other of said sides.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. An indicator holder including a body having means for attachment to a support, a supporting lever pivotally mounted on the body and comprising two members one movable relatively to the other, means for rigidly securing said members one to the other, means on one of said members for attachment thereto of an indicator, and means on the other of said members for adjusting the position of said lever as a whole.

2. An indicator holder including a body having means for attachment to a support, a supporting lever pivotally mounted on said body and comprising two members pivotally joined by the pivot of said lever, means for rigidly securing said members one to the other at said pivot, means on one of said members for attachment thereto of an indicator, and means on the other of said members for adjusting the position of said lever as a whole.

3. An indicator holder including a body having means for attachment to a support and having a groove therein, a supporting lever pivotally mounted in said groove and comprising two members one movable relatively to the other, means for rigidly securing said members one to the other, means on one end of the lever for adjusting its position as a whole, and means at the opposite end of said lever for attachment of an indicator thereto.

4. An indicator holder comprising a body having means for attachment to a support and having a groove extending lengthwise along one edge of the body, a supporting lever pivotally mounted in said groove and comprising two members pivotally joined by a pivot extending across said groove, means on said pivot for rigidly securing said members one to the other while permitting free pivotal action of said pivot in the side members of said groove an adjusting screw extending through a hole in one end of said lever and threaded into a hole in the bottom of said groove for swinging said lever on its pivot and thereby adjusting the position of said lever as a whole, and means at the opposite end of said lever for attachment of an indicator thereto.

5. An indicator holder including a body having means for attachment to a support, a supporting lever pivotally mounted on said body and comprising two members one pivotally supported on the other, means for rigidly connecting said members for simultaneous pivotal movement on said pivot, means at one end of said lever for adjustably swinging it on said pivot, and means on the other end of said lever for attachment thereto of an indicator.

6. An indicator holder including a body having means for attachment to a support, a supporting lever comprising two members, means for pivotally connecting said members and for pivotally mounting said lever as a whole, means for rigidly securing said members together at said pivot, means at one end of said lever for adjustably swinging it on said pivot, and means at the other end of said lever for attachment thereto of an indicator.

7. An indicator holder including a body having means for attachment to a support, said body having a groove therein, a supporting lever pivotally mounted on the body and comprising two members one of which has a pivot hub extending into an opening in the other, a pivot extending through the joint formed by said hub and pivotally mounted in the side parts forming said groove, means adjacent said hub for rigidly uniting said members to secure pivotal action of the lever as a whole, means at one end of said lever for adjusting its pivotal position, and means at the other end of said lever for attachment thereto of an indicator.

8. An indicator holder including a body having means for attachment to a support and also having a groove therein, a supporting lever mounted in said groove and comprising two members, a tapered hub on one of said members entered into a tapered opening in the other of said members, means pivotally mounted in said groove for the pivotal mount of said lever as a whole with its parts rigidly connected, means to force said hub into said opening to rigidly connect said members, means at one end of said lever for adjusting its pivotal position, and means at the other end of said lever for attachment thereto of an indicator.

9. An indicator holder including a body having means for attachment to a support and also having a groove therein, a supporting lever comprising an adjusting member and an indicator supporting member, a tapered hub projecting from one of said members into an opening in the other of said members, a thimble rotatably mounted in said body on one side of said groove, a pivot extending through said thimble and through said hub and pivotally mounted on the other side of said groove, said pivot screw threadedly engaging said hub, a shoulder on said pivot to force said thimble against one of the members of said lever, means on one of said members for pivotally adjusting its position, and means on the other end of the other of said members for attachment thereto of an indicator.

10. An indicator holder including a body having means for attachment to a support and having a groove therein, a supporting lever comprising two members one member having a recess in its side for the reception of the end of the other of said members, a tapered hub on one side of one of said members entering an opening in the adjacent side of the other of said members, a thimble pivotally mounted in one of the sides of said groove, a pivot extending through said thimble, through said hub, and pivotally engaged within the other wall of said groove, a thread on said pivot engaged within said hub, a shoulder on said pivot to engage said thimble and force it against the side of one of said members to draw said members into rigid engagement, means on one end of said lever for adjusting its pivotal position, and means on the other end of said lever for attachment of an indicator thereto.

JOHN E. OSLUND.